United States Patent [19]
Moore

[11] Patent Number: 4,777,352
[45] Date of Patent: * Oct. 11, 1988

[54] MICROCONTROLLER OPERATED OPTICAL APPARATUS FOR SURVEYING RANGEFINDING AND TRAJECTORY COMPENSATING FUNCTIONS

[76] Inventor: Sidney D. Moore, 2045 Idylwild Dr., Prescott, Ariz. 86301

[*] Notice: The portion of the term of this patent subsequent to Jul. 23, 2002 has been disclaimed.

[21] Appl. No.: 752,463

[22] Filed: Jul. 5, 1985

Related U.S. Application Data

[63] Continuation-in-part of Ser. No. 422,823, Sep. 24, 1982, Pat. No. 4,531,052.

[51] Int. Cl.$^4$ .................. G06F 15/58; F41G 3/06; F41G 413/32
[52] U.S. Cl. .................. 235/404; 89/41.03; 235/407; 364/561
[58] Field of Search .................. 235/404, 407, 414, 415, 235/416; 364/516, 174, 176, 525, 555, 561; 356/138, 142, 145, 247, 252, 372, 378; 33/233, 237, 238, 246, 297, 298; 350/333, 336, 507, 511, 562, 576, 566; 89/41, 41 L, 41.03

[56] References Cited

U.S. PATENT DOCUMENTS

| | | | |
|---|---|---|---|
| 3,340,614 | 9/1967 | Leatherwood | 33/50 |
| 3,386,330 | 6/1968 | Burris | 88/1 |
| 3,392,450 | 7/1968 | Herter | 33/50 |
| 3,506,330 | 4/1970 | Allen | 350/10 |
| 3,684,376 | 8/1972 | Lessard | 356/21 |
| 3,743,818 | 7/1973 | Marasco et al. | 235/404 |
| 3,990,155 | 11/1976 | Akin | 33/247 |
| 4,020,739 | 5/1977 | Piotrowski et al. | 89/41 ME |
| 4,248,496 | 2/1981 | Akin | 350/10 |
| 4,263,719 | 4/1981 | Murdoch | 33/297 |
| 4,285,137 | 8/1981 | Jennie | 33/298 |
| 4,389,791 | 6/1983 | Ackerman | 356/21 |
| 4,404,890 | 9/1983 | McAlpine | 89/41 L |
| 4,531,052 | 7/1985 | Moore | 364/561 X |

OTHER PUBLICATIONS

Pushbutton Balistics by Edgar J. Young, Rifle 81 Magazine, May-Jun., 1982.

Primary Examiner—Gary V. Harkcom
Assistant Examiner—Heather R. Herndon
Attorney, Agent, or Firm—Christie, Parker & Hale

[57] ABSTRACT

A microcontroller operated optical device for determining the distance to objects of known or estimable size which is programmed to control a movable indicator relative to a stationary indicator for spanning a dimension of an image of an object. The distance spanned by the movable indicator is inversely proportional to the distance of the object from the apparatus and the microcontroller subsequently interprets the span in terms of the distance to the object and displays the resultant distance for viewing by an operator. This device is usable in surveying instruments, riflescopes, telescopes, binoculars, and the like, and is controllable by an operator who selectively activates it by, and with, known data.

In riflescope embodiments the microcontroller is further programmed with ballistic data and, subsequent to rangefinding, calculates a holdover factor to compensate for deviations in the flight path of the bullet to be fired by the firearm to which the device is attached from the line of sight through the apparatus and selectively activates the movable indicator to move it to a second position to provide an accurate aiming reference compensatory of the deviations in the flight path.

35 Claims, 3 Drawing Sheets

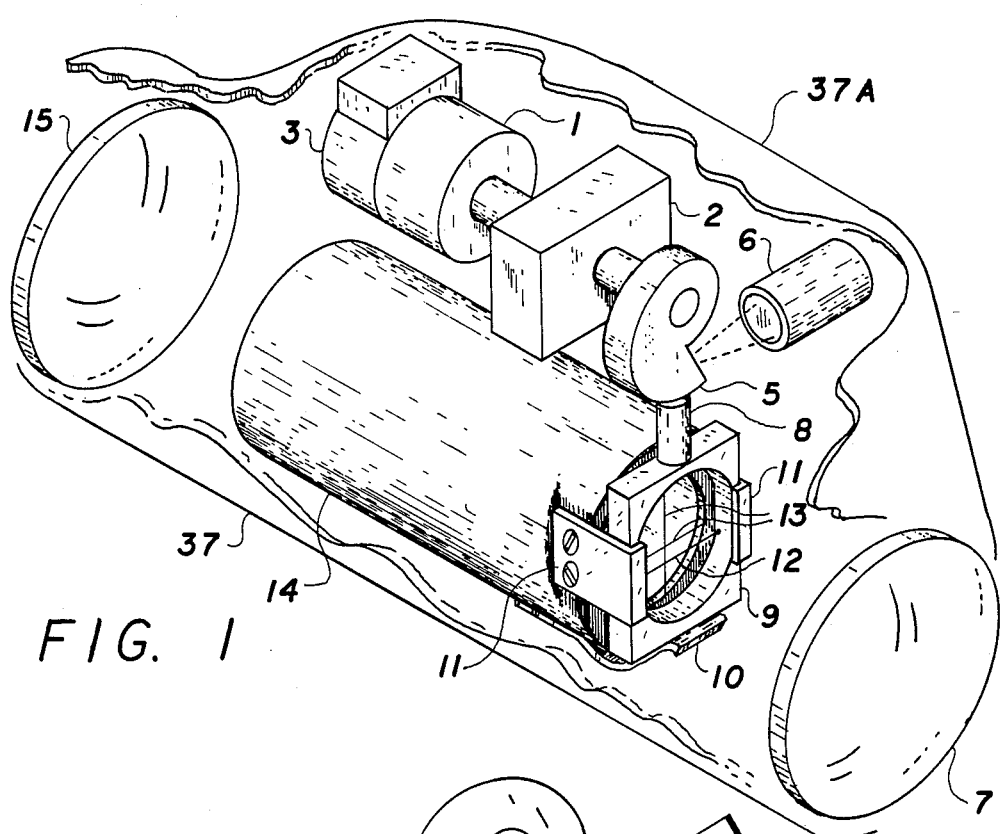
FIG. 1
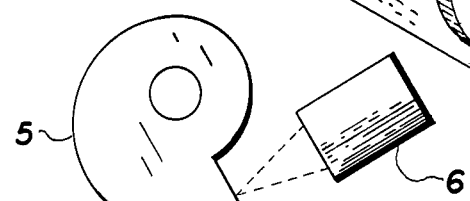
FIG. 2
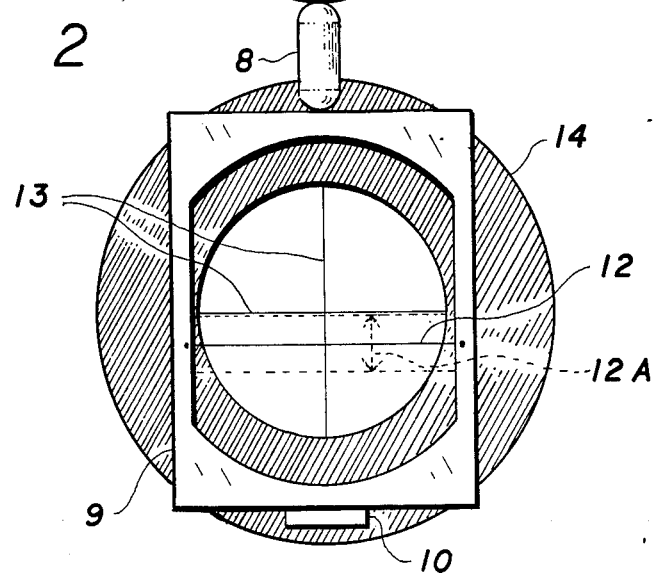

| | SWITCH 19A | SWITCH 19B | RESULTING OPERATION |
|---|---|---|---|
| 1. | OFF$_1$ | OFF$_1$ | SYSTEM OFF |
| 2. | ON | ON | RANGEFINDING ON & HOLD |
| 3. | ON | OFF | MOVABLE INDICATOR – UP |
| 4. | OFF | ON | MOVABLE INDICATOR – DOWN |
| 5. | OFF$_2$ | OFF$_2$ | AIMING COMPENSATION MODE |

MICROCONTROLLER OPERATED OPTICAL APPARATUS FOR SURVEYING RANGEFINDING AND TRAJECTORY COMPENSATING FUNCTIONS

This Patent Application is a continuation-in-part of co-pending parent U.S. Pat. Ser. No. 422,823, filed Sept. 24, 1982, now U.S. Pat. No. 4,531,052.

In the following specification and claims the expressions frame, span, and bracket, along with their derivatives, will be used interchangeably and all refer to the same operation and condition of measurement relating to object or target image size. Similarly, reference herein to crosshairs and wires are both to be understood to refer to either stationary or movable sighting references within the apparatus, whichever the case may be. It is also to be understood that reference to the front of the apparatus means the objective lens end while the rear of the apparatus is understood as being the ocular lens end.

BACKGROUND OF THE INVENTION

This invention relates to optical devices for surveying, rangefinding, and the like, and is particularly adaptable for telescopes and their use in aiming firearms. The invention will be described in a riflescope embodiment.

Since the advent of firearms, ways and means have been sought to accurately aim these devices at targets of interest. Evolving from simple notch-and-bead arrangements, the optical riflescope has proved to be the most effective device for the fulfillment of this task.

Riflescopes have been commercially available for many years and have remained largely unchanged since their introduction. These instruments comprise two basic types. The simplest form comprises a body tube, objective and ocular lenses disposed at essentially opposite ends thereof, and an erector lens assembly situated within the body tube in the space between the objective and ocular lenses. Without the erector optics the image formed by the objective lens would be inverted as in cellestial telescopes. The inversion of the images of cellestial objects is of no consequence but telescopes adapted for use in the aiming of firearms require the inclusion of erector optics in order to provide an image which will appear normal. The erector optics are mounted within a secondary tube which is itself mounted within the main body tube of the riflescope. The erector optics tube is usually controllably pivotable by means of adjustment screws for the positional fine adjustment of the target image relative to an essentially stationary sighting reference. This reference usually consists of a pair of aiming crosshairs or a reticle disposed in the riflescope either at the focal plane of the objective, in front of the erector lens assembly, or at the rear plane of focus shared by the erector and the ocular optical elements.

In a second and somewhat more complex form of riflescope, the erector optics are also controllably movable along the optical axis within their tube in such a manner as to cause the focal length of the optical system to vary to provide an image of variable size. A ring external of the body tube is manipulated by the shooter to alter, at will, the size of the image formed by the riflescope within the limits afforded by the design and structure of the particular device. This operation is typically called "zooming" and a range of from three to nine power is common. At three power the image formed by the device is three times lifesize while at nine power it is nine times lifesize.

The body tube, or housing, is provided with mounting means by which the riflescope is affixed to the firearm. Once mounted, the riflescope is "zeroed", an operation which establishes a precise relationship between the bore line of the firearm and the operator's visual line of sight through the riflescope. This adjustment is facilitated by the previously mentioned screw means constituting a horizontal (windage) adjustment and a vertical (elevation) adjustment. "Zeroing" is done in relation to an impact point at a known distance down range. For instance, a firearm may be "zeroed" so that the aiming reference, the reticle or crosshair intersection, is aligned with a point one hundred (100) meters distant and is coincident with the placement or location of the projectile at that range. Once established, the alignment is permanent until such time as the rigors of field use necessitate the re-establishment of alignment by zeroing anew.

In riflescopes of basic construction, the range to targets must be compensated for entirely by the shooter who first estimates a target's range and then imposes a degree of holdover deemed to be compensatory of projectile drop at that distance. However, few shooters become adept at estimating range and in compensating properly for bullet drop. In the field, variations in terrain, air density, and elevation can cause even the best of shooters to misjudge target range a significant percentage of the time resulting in their often being well off the mark when firing. And shooters who are expert at such judgment are able to attain accuracy with only one or two specific cartridges and rifles with which they have become familiar by practice. With increasing target distance the expert shooter aims ever higher in estimated increments of the target's image size: quarter height of target over, half height over, full height over, and so forth. This judgment is based directly on the size of the target image in the riflescope and, stated in the simples possible way, the shooter knows that as down range distance increases target image size decreases.

Limited static and dynamic means have evolved for range determination and aiming compensation based on these facts.

DESCRIPTION OF THE PRIOR ART

Static devices such as those disclosed in U.S. Pat. Nos. 3,392,450 to Herter, et al and 4,263,719 to Murdoch feature a special reticle upon which is engraved a plurality of circles of different diameters, or spaced lines, representing the "standard" eighteen inch (450 mm.) withers-to-brisket measurement of a common mule deer at a specific distance or range. Additionally, each circle or pair of lines is vertically displaced below the vertically centered horizontal crosshair an amount figured to be comepnsatory of average bullet drop at a specific range. Once the shooter selects a circle or pair of lines which most nearly matches the image size of the target, he aligns its associated horizontal line with the target and discharges the firearm.

Another static device recently patented is disclosed in U.S. Pat. No. 4,285,137 Jennie. The principle embodied in this device is essentially similar to that of the previously discussed U.S. Pat. Nos. 3,392,450 and 4,263,719, with the exception that only two sighting planes are provided. The primary sighting plane corresponds to the zero crossing point of the trajectory for dead-on aiming, while the secondary plane provides the shooter with a single reference for aiming holdover for use at greater target ranges.

Two major disadvantages are inherent in the static means exemplified by these prior art devices. First, the compensating aiming marks or planes are limited to a single set, necessitating the use of only one cartridge, the trajectory of which must be exactly matched to the reticle's single set of horizontal aiming marks. The difficulty in this is that to have even one set of static aiming marks accurately relate to a given bullet's trajectory would require the riflescope manufacturer's selection of a single popular cartridge for which the riflescope would be custom designed. This method also wrongly presupposes that all rifles fire cartridges identically. Cartridges other than the one for which the riflescope is designed could not be used with accuracy since their trajectory characteristics would differ from the fixed set of aiming holdover marks provided.

The second major disadvantage of the static means taught by U.S. Pat. Nos. 3,392,450, 4,263,719, and 4,285,137, is that for any range other than the several increments provided for by the static reticle spacing, the shooter must estimate an aiming point between pairs of indicators. This requirement has the further disadvantage of depriving the shooter of a horizontal crosshair reference to aid in holding aim upon the target.

A further disadvantage of the prior art static means is the cluttering of the field of view of the riflescope. The many circles, lines, or sighting planes, lead to confusion during critical or stressful aiming situations, as when time for aiming is limited.

These several limitations make accuracy with these static devices uncertain and often impossible.

The prior art dynamic means of rangefinding utilizing the relationship between range and the apparent size of the optical image of the target provides a more satisfactory and versatile solution and is exemplified by the devices taught in U.S. Pat. Nos. 3,340,614 to Leatherwood, 3,506,330 to Allen, 3,684,376 to Lessard, 3,386,330 to Burris, et al, 4,248,496 Akin Jr., et al, 4,389,791 to Ackerman, and indirectly, by U.S. Pat. No. 3,990,155 to Akin, Jr., et al. The device of U.S. Pat. No. 3,340,614 teaches a physical means of moving a reference wire in relation to a stationary wire to frame the target. This adjustment further communicates with elevation adjustment means to alter the line of sight in general compensation of target range and projectile drop. Similar to U.S. Pat. No. 3,340,614 is U.S. Pat. No. 4,389,791. However, the latter patent differs in that the apparently movable crosshair is actually fixedly mounted forward of the erector lens assembly and is made to appear to move up and down by the pivoting of the erector optics tube when an external ring is manipulated by the shooter. The second, stationary, wire is fixedly mounted rearward of the erector optics tube so that pivotal movement of the tube has no effect on its apparent position. A major disadvantage of the device of U.S. Pat. No. 4,389,791 is the fact that it is limited to use in fixed power riflescopes since the image of the forward wire would vary in width with changes in the zoom setting. Such zoom changes would also destroy the geometrical relationship between the two wires which is essential to the rangefinding function of the device.

In the several devices of the other patents referred to above, variable focal length optics are employed in the erector lens system disposed between the objective and ocular lenses. Thus, power of magnification may be altered, usually by means of an adjustment ring, to vary the apparent size of the target image. This operation, as has been pointed out, is commonly termed "zooming". Disposed on the ocular side of the variable optics, and therefore unaffected by changes in zooming magnification, is a fixed pair of spaced parallel horizontal wires or etched lines. The zooming ring is turned until the target image is either reduced or enlarged to fit the spacing of the pair of parallel wires or etched lines. Since the target image size is a function of target distance, the position of the zooming ring will vary accordingly. Thus, a range distance scale and an index mark may be provided in association with the zooming knob or ring to indicate target range. Once the target image is properly framed, the operator reads the range distance opposite the index mark. In the device of U.S. Pat. No. 3,506,330, changes in the magnification of the target image are directly communicated to mechanical means to automatically alter the elevation adjustment of the line of sight of the riflescope to compensate for projectile drop in a general way.

In U.S. Pat. No. 3,684,376 in provision is made to relate the determined range distance to changes in elevation adjustment for proper holdover. The assumption is that the shooter has memorized the published bullet drop tables for the cartridge in use and can mentally estimate required holdover.

The latter patent also teaches a movable second reference wire, but the advantage such movement provides is limited to adjustments in compensation for variations in target size only; and, once set, the horizontal reference wires remain static relative to one another during all rangefinding operations. The devices of this patent, as with the others which utilize fixed framing reference wires, require a zooming type embodiment and will not function in the more accurate fixed power type of riflescope. There is also no provision for aiming compensation in the devices of this patent providing, as it does, only a rangefinding function.

Of the several prior art devices actually produced, one of the most satisfactorily conceived and executed is a riflescope, manufactured by Bushnell, combining two devices which are separate subject matter of U.S. Pat. Nos. 3,990,155 and 4,248,496, both issued to Akin, Jr., et al and assigned to Baush and Lomb, Inc. The device of the Pat. No. 3,990,155 is an elevation adjusting knob assembly coupled to the erector optics tube of an associated riflescope which changes the vertical positioning of the crosshairs relative to the target image. Indicia on the adjustment knob relate to target distance. A clever and novel feature of this device is its interchangeable knob capability. Each of several knobs bears a different scale of indicia relating to the characteristics of a particular cartridge trajectory. One such knob is left unmarked for individual calibration for special applications in the field by the shooter. This feature is useful to those who handload their own cartridges since the trajectories of such loads are unique. Combined in the same riflescope is the device of the U.S. Pat. No. 4,428,496 wherein a prism is employed in combination with zooming optical elements and parallel horizontal target framing reticle wires, These provide a readout in the riflescope's field of view of the range to the target, the image of which is framed by the horizontal framing wires. Upon completion of target framing, the operator sets the elevation compensting knob to the indicated yardage figure to adjust the aiming crosshairs for proper holdover. The shooter may accomplish this without moving the riflescope away from his eye.

The described Bushnell riflescope has distinct advantages over other devices of the prior art. However, as with all other active devices of the prior art, it is a requirement of the Bushnell design that the shooter relinquish control of the rifle with one hand to operate the rangefinding device. It is a further disadvantage of this version of the combined device that the shooter must move a hand away from holding the firearm to adjust the elevation compensating knob for the proper range. After setting the elevation compensating knob, it is necessary to relocate the target in the riflescope's field of view. The time required for the several operative steps in a riflescope of this design will frequently result in missed opportunities since the target of interst will seldom be so accommodating as to remain in one place sufficiently long for their completion.

A disadvantage inherent in all devices of the prior art which provide elevation compensation for projectile drop at various ranges is that the means by which this is accomplished is permanently established by gears, threaded members, and/or cams which do not compensate for the many variables which affect projectile trajectories in their operation.

The factors which markedly affect bullet trajectories are well known in the art of firearms and fire control and much study of ballistics data has resulted in considerable knowledge relating to the understanding and prediction of projectile flight curves and general performance. Over the years many formulas, equations, and methods of calculation (such as the well known Siacci method) have evolved relating to every aspect of projectile performance. Manufacturers of cartridges apply this accumulated knowledge in exhaustive tests to establish parameters for the use of their products. The resulting extensive information is published by them in the form of tables which typically show projectile drop in inches for range increments of one hundred yards, or meters, and at various muzzle velocities.

A relatively new tool in the study of popular ballistics is the computer and many, if not all, manufacturers now generate their ballistics tables entirely by computer. When subsequently, compared to actual cartridge performance, these computer-generated tables have proved remarkably accurate.

With the increasing availability of computers and programmable calculators, interest in ballistics calculation has become widespread even among interested lay individuals and shooters. An example of this interest from recent popular literature, included herein by reference, is the article *Pushbutton Ballistics,* by Edgar J. Young, in *Rifle 81 Magazine,* May-June, 1982. This article includes a computer program for a programmable pocket calculator which can generate ballistics tables containing everything a shooter needs to know about the trajectories and flight performance of his loads.

However, it is to be noted that computer means has not been integrated directly into any of the designs of the prior art with the exception of the riflescope disclosed by U.S. Pat. No. 4,531,052, the parent of the present application.

However, the use of computers for accurate military fire control is quite old. Examples of such applications are the devices disclosed by U.S. Pat. Nos. 3,743,818 to Marasco, et al, 4,020,739 to, et al, and 4,404,890 to McAlpine. In all prior art military fire control devices an elaborate laser rangefinder is assumed. Such a means of range determination is out of the question in sport shoooting applications because of high cost, bulk, weight, and power requirements.

SUMMARY OF THE INVENTION

The present invention provides a new and improved microcontroller, operated device for surveying, rangefinding and trajectory compensating functions.

Accordingly, it is one object of this invention to provide a new and improved microcontroller operated device which may be used for rangefinding and is particularly useful in surveying instruments, rangefinding devices, and trajectory compensating aiming devices for both fixed power and variable power riflescopes.

Another object of this invention is to prvoide a new and improved microcontroller operated rangefinding control for fixed power and variable power riflescopes.

Another object is to provide a rangefinding device which can be set to accurately determine the range of any size object.

Another object of this invention is to provide a rangefinding and trajectory compensating riflescope which requires only the simple manipulation of a single toggling electrical switch assembly to accomplish to various rangefinding functions to provide full control of the device by the shooter while the associated firearm is securely held in aim upon the target with both hands of the shooter in their usual positions for best control of the firearm.

A further object of this invention is to provide electronic aiming compensation means for fixed power and variable power riflescopes.

A further object of the invention is to provide electronic range readout in a rangefinding device.

Yet another object of the invention is to provide for the calculation and display of the reamining energy of a projectile at specific ranges in a microcontroller operated riflescope.

Further objects and advantages of the invention will become apparent as the following description proceeds and the features of novelty which characterize the invention are pointed out with particularity in the descriptions and claims annexed to and forming a part of this specification.

BRIEF DESCRIPTION OF THE DRAWINGS

FIG. 1 is a semi-schematic exploded perspective view, partly broken away, showing a riflescope embodying the present invention;

FIG. 2 is a view of the elements comprising the movable horizontal sighting reference of the present invention;

DESCRIPTION OF THE PREFERRED EMBODIMENT

Figures 3, 4:
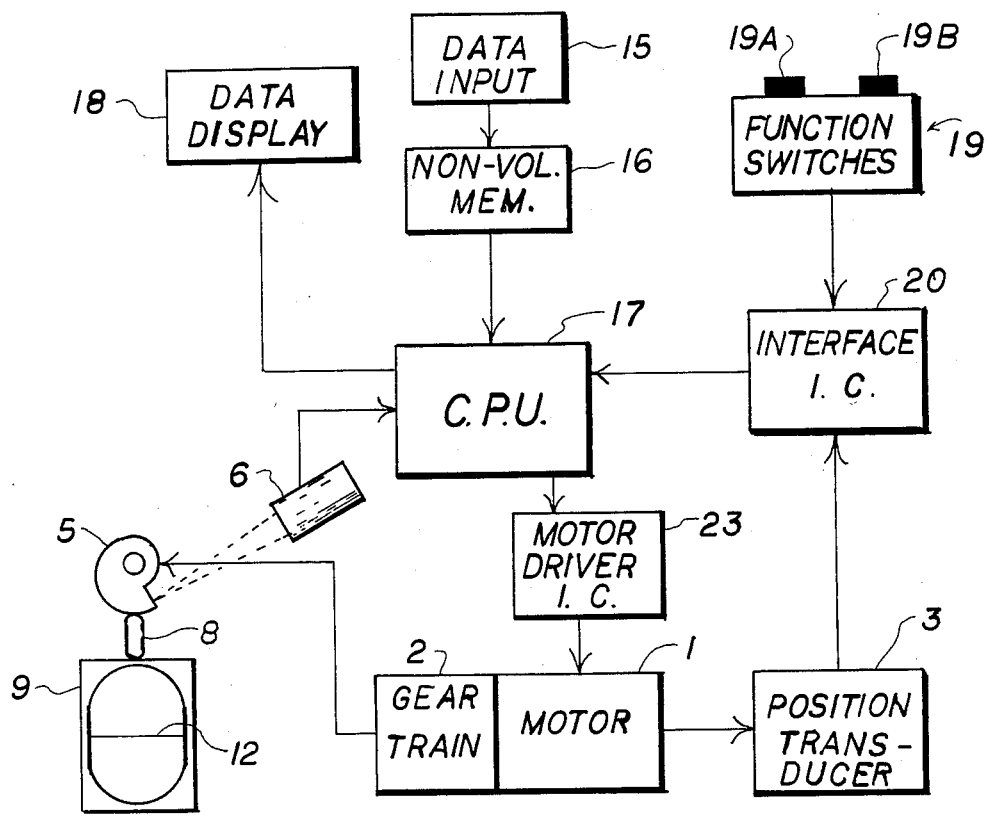
FIG. 3 is a combined block diagram and pictorial view illustrating the relationships of the various electronic and physical components of the instant invention.
FIG. 4 is a truth table of the logic states of the rangefinding function switches.

Referring more particularly to the drawings by characters of reference, FIG. 1 is a perspective view of the components of the invention in association with a riflescope housing 37, shown in cut-away view. Means for moving a controllably movable indicator, comprising a horizontal crosshair, or wire, fixedly mounted on a carrier member comprising crosshair frame 9, consist of motor 1 and gearbox 2. Positional transducer 3, motivating member comprising cam 5, and cam positional sensor 6, are shown occupying an extended portion 37A of housing 37. Rotational changes in the position of cam 5 are communicated to movable horizontal crosshair frame 9 by transfer pin 8, slidably mounted for vertical movement only in housing 37. Crosshair frame 9 is likewise slidably mounted for vertical movement ony on the ocular end of erector optics tube 14 within housing 37 by means of retaining members 11—11.

The optical axis of erector optics tube 14 is essentially common with the optical axis defined by the combination of housing 37, objective lens assembly 15, and ocular lens assembly 7. All of these components, and their operations, are old in the art of riflescopes.

Fixedly mounted at the ocular end of erector optics tube 14, and perpendicular to the optical axis thereof, is a stationary sighting reference comprising stationary vertical and horizontal crosshairs 13—13.

Erector optics tube 14 is pivotably mounted within housing 37 to permit adjustments of the positions of images formed by objective lens 15 relative to stationary crosshairs 13—13. These adjustments are for the purpose of "zeroing" the firearm/riflescope combination in the usual manner to provide perfect alignment of the target with the intersection of crosshairs 13—13 for a specific range, usually one hundred (100) or two hundred (200) meters. Zeroing in this manner is old in the art.

Referring to FIGS. 1 and 2, movable horizontal crosshair frame 9, transfer pin 8, and cam 5 are biased into intimate contact with one another by means of spring 10 situated beneath crosshair frame 9 and fixedly attached at its opposite end to the underside of erector optics tube 14.

It can readily be seen that rotational movement of cam 5, induced by the selective energizing of motor 1, will cause movable horizontal crosshair frame 9 to move selectively upward and downward against the bias of spring 10. Such variable vertical displacement serves to create a corresponding variance in the space between stationary horizontal crosshair 13 and movable horizontal crosshair 12. This variable spacing between stationary horizontal crosshair 13 and movable horizontal crosshair 12 provides the means for measuring the target image. Since this measurement is inversely proportional to target distance, or range, the latter may be readily calculated as will be explained in detail in the Description of Operation which follows.

Control signals to motor 1 are provided by a microcontroller which includes a CPU described below. Signals output by the microcontroller are dependent upon both permanent programming and variable temporary instructions input by the operator. The latter consist of values specifically relating to target dimension, ballistic data pertaining to the particular cartridge in use, and a variety of additional data such as elevation at the hunting site, atmospheric pressure, and so forth, all of which affect the flight performance of the bullet. Such data as these, when accounted for, provide far more accurate aiming compensation than has been conventionally possible.

When cam 5 is positioned so that transfer pin 8 and movable horizontal crosshair frame 9 are at the uppermost extent of their limits of travel, the image of movable horizontal crosshair 12, formed by ocular lens assembly 7, is positioned so that its upper edge and the lower edge of stationary horizontal crosshair 13 are essentially tangent to one another. As cam 5 rotates, the distance between these two edges increases as movable horizontal crosshair 12 moves downward. The pitch of cam 5 is such that movable horizontal crosshair 12 will be, when at its lowest point of travel, at, or below, a point representative of the greatest holdover factor to be encountered in the field under worse case conditions of trajectory curve and target range.

As previously mentioned, erector optics tube assembly 14 is axially pivotable within housing 37 for precise alignment with the firearm on which the device is mounted. This alignment procedure, zeroing of the riflescope/firearm combination, is performed so as to provide a strike point for the most often used cartridge that is coincident with the intersection of the stationary horizontal and vertical crosshairs at either one hundred (100) or two hundred (200) meters. In the instant invention the distance chosen for zero is input during field-programming operations to be used by the microcontroller in subsequent computations. The selected zero distance is immaterial to the operation of the invention so long as the proper figure is input during the field programming of the device.

Positional transducer 3 provides signals to the microcontroller relating to the rotational activity of motor 1. Transducer 3 may be of the type which provides a train of pulses which are counted by the microcontroller. Typical of such devices are the incremental shaft encoders manufactured by Hewlett-Packard. That company's HED-5000 series of encoders is an example and technical data pertaining thereto is incorporated herein by reference. The HED-5000 series typically resolves five hundred (500) counts per shaft revolution. The count from the encoder will be cumulative or subtractive depending upon the direction of rotation of motor 1. An encoder of the HED-5000 type determines this by having two output channels which are out of phase by ninety (90) degrees, and interface circuitry which detects which channel is leading the other. For instance, assuming that transducer 3 outputs five hundred (500) pulses for each revolution of motor 1, if motor 1 rotates through fifty (50) revolutions of its shaft in a clockwise direction, the microcontroller 4 will accumulate a positive count of twenty-five thousand (25,000) pulses. If, at this point, motor 1 is reversed for sixty (60) revolutions, the microcontroller subtracts thirty thousand (30,000) counts from the accumulated total resulting in a negative count of minus five thousand (−5,000) pulses. Reversing motor 1 once more for ten (10) revolutions in a clockwise direction will add a positive five thousand (5,000) pulses to the count, bringing the tally back to the original starting position with a count of zero (0). It is helpful to the understanding of the operation of the instant invention to consider this starting position as being the "zero start position" while the accumulating pulses represent positive, additive, values and subtractive pulses represent negative values.

If a simple incremental encoder is utilized which does not have phase detection, as embodied in the HED-5000 series, the microcontroller can readily be programmed to monitor rangefinding function switches 19A–19B to determine whether the count is cumulative or subtractive.

Alternatively, transducer 3 may be of the absolute encoder type which provides an absolute, encoded value for each fractional degree of change in the associated shaft's rotation. In this case, the counting of a pulse train, detection of direction of shaft rotation, and a zero start position are not required.

Gearbox 2 divides the rotation of the shaft of motor 1 by a factor which, for purposes of illustration, may be on the order of one hundred-to-one (100 to 1). Thus, a full rotation of the output shaft of gearbox 2 will result in a count output from transducer 3 of fifty thousand (50,000) pulses. This translates into about one hundred thirty-nine (139) pulses for each degree of rotation of the output shaft of gearbox 2. Great resolution of the position of the movable sighting reference is thus attained.

Cam 5 is fixedly attached to the output shaft of gearbox 2 and does not rotate a full revolution from one extreme of its range of movement to the other. Its range is, instead, on the order of three hundred and fifty (350) degrees. Thus, the pulse range, from one extreme to the other, totals about forty-eight thousand six hundred fifty (48,650) pulses. Since the actual range of vertical movement of movable horizontal crosshair 12 is about 4 mm, each pulse from transducer 3 represents approximately eight hundred thousandths of a millimeter (0.00008 mm). Thus, if the magnifying power of the ocular lens is 10×, the movement of crosshair 12, imaged by the ocular lens 7, will appear to be around eight ten thousandths of a millimeter (0.008 mm)—a change imperceptible to the human eye.

This ability to resolve minute changes in the rotation of cam 5 results in extreme accuracy in the measuremnt of corresponding changes in the position of movable horizontal crosshair 12. It can be readily appreciated, given such resolution in position transduction capability, that any backlash inherent in the gear train of gearbox 2 will introduce a significant error unless compensated for. Compensation is accomplished in the instant invention by introducing an appropriate compensation factor into the permanent programming of microcontroller 4. This compensation factor will mathematically cancel out the backlash accompanying each reciprocation in the direction of movement of the output shaft of gearbox 2.

With reference now to FIG. 2 alone, cam 5, position sensor 6, transfer pin 8, movable horizontal crosshair 12, movable carrier frame 9, frame bias spring 10, stationary vertical and horizontal crosshairs 13—13, and an end plane of erector optics tube 14, are shown to illustrate with greater clarity their relationship to one another and their functions as previously described with reference to FIG. 1. Position sensor 6 may be a mechanical switch or, preferrably, an optical sensor such as Hewlett-Packard's HEDS-100 series optical reflective sensor. Technical data on this device is incorporated herein by reference. Movable horizontal crosshair 12 is shown centered in its range of possible travel depicted by dotted lines and double-ended arrow 12A. At this position the radiant energy emitted by the emitter of optical sensor 6 is reflected back to the sensor's detector section to signal the microcontroller that cam 5 has arrived at a precise position. For descriptive purposes this position will be referred to as the "zero" position of cam 5. However, this central zero position is entirely arbitrary and can be anywhere in the travel range of the cam. All that is required is that the programming of the microcontroller correspond to whatever position is determined to be optimum.

Shown schematically in FIG. 3 are cam 5, positional sensor 6, transfer pin 8, movable carrier frame 9, and movable horizontal crosshair 12. All other essential components comprising the microcontroller and associated circuit elements are depicted in block diagram form. Position sensor 6 produces a signal when cam 5 is positioned so that movable horizontal crosshair 12 is midway in its range of travel. Sensor 6 is highly discriminent in its monitoring of cam 5. The slightest rotational deviation of cam 5 from the sensed mid-position causes sensor 6 to change states, thus signaling the microcontroller that cam 5 has deviated from its zero position. Permanent programming of the microcontroller includes a routine relating to this operation to provide reciprocating power to motor 1 for the purpose of slewing cam 5 to its midpoint position based on the output state of sensor 6. Thus, on power-up, the microcontroller senses the input from sensor 6 and, if its state indicates that cam 5 is not at its zero start position, outputs a drive signal to motor 1. A subsequent change in the state of the signal from sensor 6 indicates to the microcontroller that the midpoint of travel has been reached and its output drive signal to motor 1 is terminated. The microcontroller now, once again, checks the state of the incoming signal from sensor 6. If the signal is such that the midpoint of travel has been attained, it zeros its counters, resetting itself to a standby condition awaiting input from rangefinding function switches 19A and/or 19B or field programming instructions from data input means 15. Data input means 15 may be in the form of a standard keypad such as is used in pocket calculators.

In embodiments utilizing an absolute encoder, as previously described, such an element as sensor 6 and the zeroing operation are not required.

Field programming input concerns such variables as ballistic data for the cartridge in use, elevation at the hunting site, atmospheric pressure, dimensions of the game animal being hunted, and the like. These field instructions are conveyed to non-volatile memory 16 where they remain until subsequently altered by the shooter. Non-volatile memory 16 communicates the values of these stored variables to CPU 17 for use in subsequent computations. Non-volatile memory 16 retains all instructions indefinitely when the system is tuned off. Typically, this retention period will run for ten years, or more.

The only other operator input means is rangefinding function switch pad 19 comprising rangefinding functions switches 19A and 19B, comprising a pair of side-by-side momentry pushbutton swithes which may be of the membrane variety commonly available and frequently employed in such devices as pocket calculators. Switch pad 19 is connected to interface IC 20 in a conventional manner by means of a length of electrically conductive cable so as to allow the shooter to locate switch pad 19 upon the stock of the firearm in such a location as to be directly beneath a thumb or finger when the hand holds the firearm in the customary aiming and shooting position. Thus, the shooter may readily activate one or both switches 19A–19B by a gentle pressing and rolling motion of his thumb or finger to-and-fro with absolutely no movement of his hand away from its usual, secure, grip upon the firearm. Signals from switches 19A-19B are buffered by interface IC 20 and thence conveyed to CPU 17 to be interpreted thereby in a manner to be described shortly in relation to FIG. 4. Switch pad 19 may be affixed to the firearm by means of double-sided tape, or the like, in a manner so as to allow ready repositioning if desired.

CPU 17 outputs signals to driver IC 23 which functions as a buffer to isolate drive motor 1 from CPU 17 as well as to provide high energy drive signals to motor 1.

In FIG. 3, drive motor 1, gearbox 2, position transducer 3, cam 5, position sensor 6, transfer pin 8, movable carrier frame 9, and movable horizontal crosshair 12, have already been described relative to FIG. 2. Signals from position transducer 3, in the form of a pulse train, are buffered by interface IC 20 and conveyed thence to CPU 17. CPU 17 constantly monitors this incoming pulse train and keeps count of the pulses, whether additive or subtractive, to accurately track rotational changes in the position of cam 5. At the end of the rangefinding mode—that is, when the shooter releases the rangefinding function switches 19A-19B—the aiming compensation mode automatically commences. After this event takes place, the value of the count is utilized by CPU 17 in its computations to determine aiming holdover and, subsequently, in driving movable horizontal crosshair 12 to the proper position to provide the necessary holdover (aiming compensation) when the shooter holds the image of wire 12 directly aligned upon the image of the target.

Data display 18 provides visual feedback to the operator to facilitate the proper input of variable field data and to display the range to the target in yards or meters. In more elaborate embodiments of the invention another function of display 18 is to display remaining energy for particular cartridges at various ranges. Such information is useful in determining the liklihood of an effective hit for long range targets.

In the more elaborate devices of the instant invention, the microcontroller may also be programmed to detect the threshold of effectiveness of the remaining energy of the bullet and to produce a signal to alert the shooter in instances wherein the remaining energy is insufficient for an effective hit.

FIG. 4 is a self-explanatory truth table showing the logical interpretations of all possible inputs provided by rangefinding function switch pad 19. Switch condition #5—both switches 19A and 19B released after the rangefinding operation is complete—is interpreted by CPU 17 as the end of rangefinding and the commencement of the aiming compensation mode. At this point CPU 17 instantaneously computes holdover based on all previously input field data in combination with the last determined essential information—target range. If, at this point, the shooter decides that rangefinding must be repeated, he simply depresses switches 19A-19B once more and CPU 17 immediately returns to the rangefinding mode as before. In every case, upon release of switches 19A-19B, CPU 17 computes holdover and instantaneously drives movable horizontal crosshair 12 to the proper holdover position for the indicated range.

Figure 5:
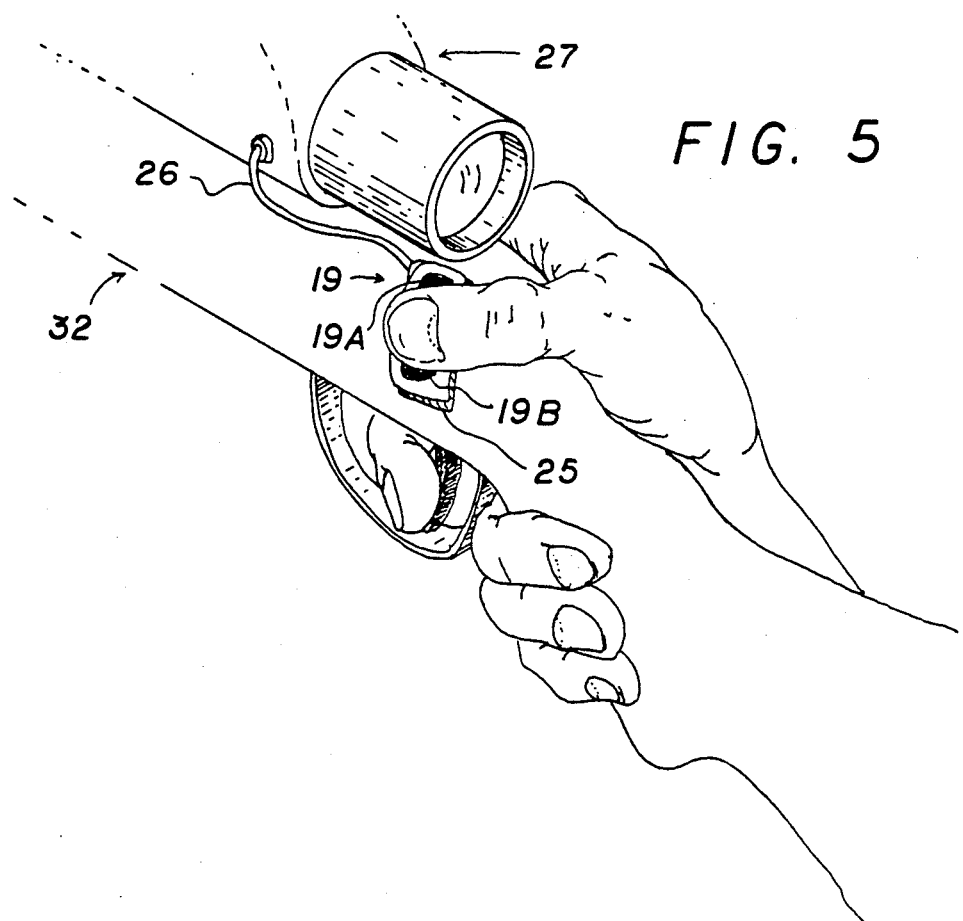
FIG. 5 is a pictorial view of the manner in which the rangefinding function switch pad may be disposed upon a firearm and accessed by a shooter.

FIG. 5 presents a pictorial view of a riflescope embodying the instant invention 27 mounted on a firearm 32. The shooter's hand is shown gripping the firearm in its usual position for aiming and firing. The thumb of the shooter's hand, also in its usual position on the stock of the firearm, is situated directly over rangefinding function switch pad 19 for ready access to, and operation of, switches 19A-19B. Switch pad 19 may be affixed to the firearm by adhesive means 25 which may, as previously mentioned, by double-sided tape, or the like. Rangefinding function switches 19A and 19B may, of course, be mounted integrally with the housing of the apparatus itself. In certain applications it might even be desirable to have two or more sets of these control switches mounted strategically for a variety of shooting situations.

Figures 6, 7:
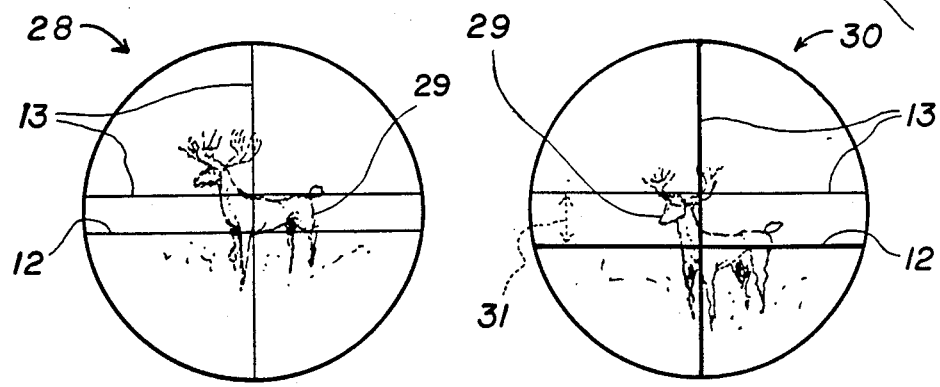
FIG. 6 is a sight picture provided by a device of the present invention illustrating the proper bracketing of a target image.
FIG. 7 is a sight picture provided by a device of the present invention illustrating the proper use of the stationary vertical crosshair and the movable horizontal crosshair in aiming at a target.

FIGS. 6 and 7 depict, respectively, sight pictures 28 and 30, available to a shooter using a device of the instant invention. In FIG. 6 a target image 29 is shown bracketed by stationary horizontal crosshair 13 and movable horizontal crosshair 12. Normally, the chest distance (the withers-to-brisket measurement) spans about four hundred fifty millimeters (450 mm), about eighteen inches (18"). This value would have been input by the shooter during field programming. If the game animal were, instead, a rabbit, the shooter would have input a value of one hundred fifty millimeters (150–200 mm), about six to eight inches (6–8"). Also, if the hunt were taking place after a particularly favorable season for animal growth - as when forage was very plentiful - the actual average size of a deer's chest measurement might be five hundred fifty millimeters (550 mm), about twenty-two inches (22") or more. This information is readily obtainable from taxidermists and hunting supply stores in the area of the hunt as well as from hunters in the field. Thus, the versatility and precision of the instant invention may be readily appreciated. These and all other variables normally inherent in the art of sport shooting, which have heretofore been only very generally compensated for, if at all, are precisely compensated for in the instant invention.

FIG. 6 illustrates the rangefinding mode in the "hold" condition (condition #2 of FIG. 4–both switches 19A and 19B depressed) wherein movable horizontal crosshair 12 is held stationary in its position to allow careful visual verification by the shooter that the position does not need "fine-tuning" to more precisely span the target image. The proper bracketing of a target image is illustrated by FIG. 6.

Upon determining that target image bracketing is proper, as illustrated in FIG. 6, the shooter releases rangefinding function switches 19A-19B, simultaneously. CPU 17 instantaneously utilizes the resulting range value in its computations for aiming holdover and immediately outputs the necessary drive signal to motor 1 to cause movable horizontal crosshair 12 to move to the proper position in compensation for bullet drop at that range. This repositioning of movable crosshair 12 for aiming compensation is illustrated in FIG. 7. Vertical crosshair 13 and movable horizontal crosshair 12 are shown darker than stationary horizontal crosshair 13 for clarity and emphasis. All three wires would, in reality, be of the same weight. The distance 31 between stationary horizontal crosshair 13 and movable horizontal crosshair 12 represents the proper amount of holdover for the particular combination of cartridge, range, and other variables. Note that stationary horizontal crosshair 13 is now situated well above the target image so that the firearm is effectively aiming into the open air above the target. Of course, when the bullet has travelled over the curve of its trajectory and arrives at the target, its true intercept point will be below stationary horizontal crosshair 13 by an amount equal to the displacement of movable crosshair 12 from stationary horizontal crosshair 13, intersecting, instead, with the image of movable horizontal crosshair 12. Thus, in aiming, the shooter brings the image of movable crosshair 12 into alignment with the exact spot on the image of the target animal where he wishes the bullet to strike and then discharges the firearm.

It is to be noted with particularity that at no time during the rangefinding and aiming compensation operations of the instant invention is it necessary for the shooter to take the firearm away from aim upon the target, or to move either of his hands away from their customary grips upon the firearm in order to adjust knobs, or the like, as is common with riflescopes of the prior art. The only manipulation required in the instant invention is the gentle pressing and slight rocking of a thumb or finger upon rangefinding function switch pad 19 during the rangefinding mode. All other operations are performed automatically by the various other elements of the invention. Thus, speed in arriving at exact required holdover and aiming is greatly improved. Additionally, movements associated with the various activities required of the shooter in the operation of devices of the prior art are apt to be detected by the target animal, thus alerting it to danger with the result that it is likely to bolt for safety.

While the foregoing description is highly particular in describing a preferred embodiment of the instant invention, it is to be understood and appreciated that numerous alternative elements and structures may be used with equal effectiveness in particular embodiments anticipated by the invention but not described herein. For example movable carrier frame 9 might include an enclosure for a caged eccentric with the resulting elimination of biasing spring 10. It should, as well, be equally obvious that shapes, or forms, other than lines may be substituted for the described reference wires and crosshairs. And the invention may be embodied in devices other than riflescopes to be used solely for rangefinding such as surveying transits, binoculars, and the like. Accordingly, the scope of the invention must be determined not by the embodiments presented but by the appended claims and their legal equivalents.

I claim:

1. An optical apparatus for use in surveying and the aiming of firearms for determining the distance between the apparatus and an object of interest of known or estimable size and having a housing defining an optical axis therethrough and supporting objective and ocular lenses spaced apart and aligned upon the optical axis, the objective and ocular lenses defining a plane of focus within the housing upon which an image of an object is formable for viewing by an operator, and a sighting reference disposed within the housing, an image of which is formable at the plane of focus for viewing by an operator simultaneously with that of an object, the apparatus comprising:

a microcontroller programmed for performing rangefinding operations and calculations related thereto and for receiving and producing a variety of output control signals related to the rangefinding operations and calculations performed by the microcontroller, including first memory means for storage of permanent instructions and data pertaining to the rangefinding operations and calculations made thereby, and second memory means for storage of temporary instructions and data pertinent to the rangefinding operations and calculations made thereby;

controllably movable indicator means movably mounted within the housing and responsive to output control signals from the microcontroller and situated so that an optical image of the movable indicator means is formed for viewing by an operator in association with the image of the sighting reference and the image of an object of known or estimable size for use for measuring a size of an image of the object;

drive means for selectably moving the controllably movable indicator means in response to output control signals from the microcontroller;

positional transducer means associated with the controllably movable indicator means and responsive to variations in the position thereof and connected to the microcontroller for conveying to the microcontroller an indicator position signal relating to the position of the controllably movable indicator means, the indicator position signal being utilized by the microcontroller to affect subsequent rangefinding operations and calculations made thereby;

input means, selectively controllable by an operator, for producing input control signals for use by the microcomputer for affecting rangefinding operations and calculations performed thereby for producing a first output control signal for use by the drive means for producing a first controlled movement of the controllably movable indicator means; and correction means associated with the microcontroller for producing a second output control signal in response to the position of the movable indicator means and in response to data in the first and second memory means, the second output control signal being utilized by the drive means for producing a corrective second controlled movement of the controllably movable indicator means.

2. The apparatus of claim 1, wherein the sighting reference is a reference line viewable by an operator; and wherein the controllably movable indicator comprises a second line fixedly supported by a carrier member, the carrier member being slidably mounted for linear movement, the sighting reference and the controllably molvable indicator being viewable together by an operator and defining a controllably variable space for spanning a dimension of an object of known or estimable size, the extent of the resultant distance between the reference line and the second line being inversely proportional to the distance of the object from the apparatus; and wherein the position signal produced by the positional transducer is indicative of said resultant distance, and the transducer conveys the signal to the microcontroller to be utilized thereby in subsequent calculations to determine the distance to the object; and wherein the microcontroller further comprises permanent instructions in said first memory means for processing the resultant signal from the positional transducer and for making calculations therewith to determine the distance from the apparatus to an object and, subsequently, to produce signals indicative of the result of the processing of the resultant signal; and wherein the means for selectably moving the controllably movable indicator comprises an electric motor having an output shaft to which is fixedly attached a motivating member for engagement with the carrier member for controlled linear movement thereof in response to the output control signal indicative of the processed resultant signal.

3. The apparatus of claim 2, wherein the motivating member is an eccentric fixedly attached to the motor and slidably engaged with the carrier member so that operation of the motor is translated into linear movement of the carrier member.

4. The apparatus of claim 2, further comprising a gearbox attached to the output shaft of the electric motor for reducing the rate of rotation of the output shaft of the motor, the gearbox having an output shaft to which is fixedly attached the motivating member, the motivating member translating rotational activity of the output shaft of the gearbox into reciprocating linear travel and conveying the translated travel to the carrier member for reciprocating linear movement thereof.

5. The apparatus of claim 2, wherein the positional transducer means comprises an encoder attached to the motor for translating the rotational activity of the motor into an encoded signal for use by the microcontroller in the operations and calculations performed thereby.

6. The apparatus of claim 1, wherein the second memory means of the microcontroller further comprises means to receive and process data from an operator relating the size of more than one size object the distance to which is to be determined; and wherein
the microcomputer further includes means for performing rangefinding operations and calculations using a prevailing set of variable data resident in its second memory means at a particular time; and wherein
the input means comprises means for causing a variety of instructions and data provided by an operator to affect the rangefinding operations and calculations made by the microcontroller so as to make the apparatus responsive to more than a single set of quantitative parameters relating to more than a single size object an image of which is to be measured and the distance to which is to be determined.

7. The apparatus of claim 1, and further comprising:
a position sensor associated with the means for selectively moving the controllably movable indicator means for sensing an initial starting position thereof for providing a positional reference for use by the microcontroller in subsequent rangefinding operations and calculations made thereby.

8. The apparatus of claim 1, in which the microcontroller is mounted to the apparatus; and the input means comprises switch means mounted on the apparatus for use in reciprocally moving the movable indicator means relative to the sighting reference to arrive at a preselected distance between them for defining the apparent size of the object and therefore the range to said object from the apparatus.

9. The apparatus of claim 8, in which the means for selective moving the controllably movable indicator means comprises a cam on an output shaft of an electric motor, the cam being engaged with a carrier member for controlled linear movement thereof, the first and second output control signals from the microcontroller being sent to the motor for controlling rotation of the cam.

10. The apparatus of claim 1, in which the second memory means contains ballistics data for use in generating the second output control signal.

11. The apparatus of claim 1, in which the input means is activated to produce the first output control signal, and in which the input means is deactivated to thereafter cause the correction means to automatically generate the second output control signal for producing the corrective movement of the movable indicator means.

12. An optical apparatus for attachment to a firearm for aiding in aiming the firearm at a target of known or estimable size, for determining the distance between the apparatus and a target, and for providing an aiming indicator compensatory of deviations in the flight path from the optical axis of the apparatus of a projectile to be launched from the firearm, and having a housing defining an optical axis therethrough and supporting objective and ocular lenses spaced apart and in alignment upon the optical axis, the optical axis lying in a predetermined alignment with the bore of the firearm to which it is attached and adjustable with respect thereto, an image erecting lens disposed upon the optical axis between the objective and ocular lenses, the image erecting and ocular lenses defining a plane of focus within the housing whereupon an erect optical image of a target is formable and viewable by an operator, and a sighting reference adjustably aligned with the optical axis and disposed within the housing relative to the plane of focus so that an image of the sighting reference is viewable by an operator in combination with an image of a target, the apparatus further comprising:
controllably movable indicator means movably mounted within the housing and producing an image which is viewable by an operator in association with a combined image of the sighting reference and that of a target of known or estimable size for use for measuring a size of an image of the target;
a microcontroller with memory means for storage of permanent and temporary data and instructions and programmed for performing rangefinding operations and calculations related thereto, and for performing ballistic calculations based on previously preformed rangefinding operations and calculations, and for receiving and producing output control signals related to the rangefinding operations and ballistic calculations, including means for producing a first drive signal indicative of a first position of the controllably movable indicator means, the microcontroller subsequently computing a correction factor based on ballistic data stored in the microcontroller memory means and a newly calculated value for a range to said target for use in compensating for a deviation in the path of said projectile from the optical axis of the apparatus, the microcontroller subsequently, upon completion of rangefinding operations and calculations, producing a second drive signal to cause the controllably movable indicator means to move to a second position for use by an operator in sighting upon the target, the second position being such as to compensate for a vertical displacement of the projectile from the optical axis of the apparatus for the calculated range;

means for input of instructions and data by an operator into the memory means of the microcontroller for affecting the rangefinding operations and calculations made thereby;

the controllably movable indicator means being responsive to the first drive signal from the microcontroller for moving to a position relative to the sighting reference to define the apparent range to the target and subsequently, for responding to the second drive signal from the microcontroller so as to move to a corrected position for use by an operator in sighting upon the target, said corrected position being such as to compensate for a vertical displacement of the projectile from the optical axis of the apparatus for the calculated range;

means for selectably moving the controllably movable indicator in response to the drive signals from the microcontroller; and positional transducer means associated with the movable indicator and responsive to variations in the position thereof and connected to the microcontroller so as to convey to the microcontroller a positioning signal relating to variations in the position of the movable indicator means, the positioning signal being subsequently utilized by the microcontroller in the range finding operations and calculations made thereby.

13. The apparatus of claim 12, wherein the microcontroller further calculates the effectiveness of the remaining energy of the projectile in terms of striking power at said range and outputs a signal to the operator if the remaining striking power is calculated to be below a threshold level of energy for an effective hit.

14. The apparatus of claim 12, in which the means for input by an operator of data and instructions into the microcontroller includes means to alter the set of ballistic data stored therein so as to be responsive to a variety of cartridges and field conditions.

15. The apparatus of claim 12, wherein the sighting reference comprises a pair of intersecting reference lines, the intersection of the lines being essentially centered upon the optical axis of the apparatus; and wherein the controllably movable indicator comprises a line fixedly supported within a movable carrier member, the carrier member being slidably mounted for linear movement, the reference lines and the controllably movable line being viewable together by an operator, one of the reference lines and the movable line defining a controllably variable space between them for spanning a dimension of an image of a target of know or estimable size, the extent of the resultant distance between the lines being inversely proportional to the distance of the target from the apparatus; and wherein the positional transducer, subsequent to the spanning operation, producing a signal indicative of the spanning position of the controllably movable indicator for conveying said signal to the microcontroller to affect operations and ballistic calculations performed thereby; and wherein the microcontroller is further programmed to integrate the value of the resultant position of the controllably movable indicator into calculations subsequently made thereby and to produce said first drive signal indicative of the calculated distance to the target and to produce said second drive signal to cause the means for selectably moving the controllably movable indicator to move the indicator to a position compensatory of the deviation in the flight path of the projectile from the optical axis of the apparatus.

16. The apparatus of claim 12, wherein the means for selectably moving the controllably movable indicator comprises a reversible electric motor, and a motivating member attached to an output shaft thereof, the motivating member engaging the carrier member for controlled, reciprocating, linear movement thereof.

17. The apparatus of claim 16, and further comprising;

a gearbox interposed between, and attached to, the motor and the motivating member for reducing the amount of rotational travel of the motor shaft and for conveying the reduced rotation to the motivating member for controlled, reciprocating, linear movement of the carrier member.

18. The apparatus of claim 16, wherein the motivating member is an eccentric for translating rotational travel of the motor into reciprocating, linear, travel of the carrier member for controlled, reciprocating, linear movement thereof.

19. The apparatus of claim 12, wherein the sighting reference comprises a horizontal reference line intersecting a reference vertical line, the intersection of the reference lines being essentially centered upon the optical axis of the apparatus; and wherein the controllably movable indicator comprises a horizontal line fixedly supported within a carrier member, the carrier member being slidably mounted for vertical movement, the horizontal line and the controllably movable line being viewable together by an operator, the horizontal line and the movable line defining a controllably variable space between them for spanning a dimension of an image of a target of known or estimable size, the extent of the resultant distance between the lines being inversely proportional to the distance of the target from the apparatus; and wherein the positional transducer, subsequent to the spanning operation, produces a signal indicative of the spanning position of the controllably movable indicator and conveys the signal to the microcontroller to affect rangefinding operations and ballistic calculations performed thereby; and wherein the microcontroller is further programmed to integrate the value of the resultant position of the controllably movable indicator into calculations subsequently made thereby and to produce the first drive signal indicative of the calculated distance to the target and to produce the second drive signal to cause the means for selectably moving the controllably movable indicator to move the indicator to a position compensatory of the deviation in the flight path of the projectile from the optical axis of the apparatus.

20. The appartus of claim 12, wherein the means for selectably moving the controllably movable indicator comprises a reversible electric motor, a gearbox attached thereto for reducing the speed of rotation of the motor, the gearbox having an output shaft to which is fixedly attached an eccentric member which, in turn, engages the carrier member for controlled vertical movement thereof only.

21. The appartus of claim 12, and further comprising a position sensor associated with the means for selectably moving the controllably movable indicator for sensing an initial starting position thereof for providing a positional reference for use by the microcontroller in subsequent operations and calculations made thereby.

22. The apparatus of claim 12, in which the microcontroller means is mounted to the firearm; and including controllable input means comprising switch means mounted on the firearm remote from the optical apparatus for use in reciprocally moving the movable indicator means relative to the sighting reference to arrive at a preselected distance between them for defining the apparent size of the target and therefore the range to said target from the firearm.

23. The apparatus of claim 22, in which the means for selective moving the controllably movable indicator means comprises an electric motor and an eccentric member on an output shaft of the motor, the eccentric member engaging a carrier member for controlled reciprocating linear movement thereof.

24. The apparatus of claim 22, in which the switch means are mounted on the firearm so that the user can control operation thereof while holding the firearm with both hands in an aiming position.

25. The apparatus of claim 22, in which the switch means are activated to produce the first drive signal and are deactivated to cause the microcomputer to automatically thereafter generate the second drive signal for producing the corrective movement of the movable indicator means.

26. Apparatus for attachment to a firearm for aiding in the aiming of the firearm at a target of known or estimable size, the apparatus comprising:
   a housing having an optical axis and supporting objective and ocular lenses spaced apart along the optical axis, means disposed between said lenses for defining a plane of focus within the housing upon which an optical image of the target is formable and viewable by an operator, and a sighting reference for alignment with the optical axis and disposed within the housing relative to the plane of focus, so that an image of the sighting reference is viewable by the operator in combination with an image of the target;
   a microcontroller carried on the housing and programmed for performing rangefinding operations and calculations related thereto, the microcontroller including first memory means for storage of permanent instructions and data related to said rangefinding operations and calculations, second memory means for storage of temporary instructions and data related to said rangefinding operations and calculations, and means for producing control signals related to such rangefinding operations and calculations;
   controllably movable indicator means movably mounted within the housing and positioned so that an optical image of the indicator means is formed for viewing by an operator in combination with the image of the sighting reference and the image of the object for use in measuring a size of the image of the object, the controllably movable indicator means being responsive to control signals output from the microcontroller;
   drive means for selectively moving the controllably movable indicator means in response to the control signals output from the microcontroller;
   input means on the firearm selectively controllable by the operator for producing input control signals for use by the microcontroller for affecting rangefinding operations and calculations performed thereby for producing a first output control signal for use by the drive means for producing a first controlled movement of the controllably movable indicator means; and
   correction means associated with the microcontroller for producing a second output control signal in response to the position of the movable indicator means and in response to the data in the first and second memory means, the second output control signal being utilized by the drive means for producing a corrective second control movement of the controllably movable indicator means.

27. The apparatus of claim 26, in which the input means comprises switch means mounted on the firearm for use in reciprocally moving the movable indicator relative to the sighting reference to arrive at a preselected distance between them for defining the apparent size of the object and therefore the range to said object from the apparatus.

28. The apparatus of claim 27, in which the drive means comprises an electric motor having an output shaft with a rotatable cam engaged with a carrier member for the movable indicator so that rotational movement of the output shaft is translated into linear movement of the carrier member.

29. The apparatus according to claim 26, in which the second memory means contains ballistics data for use in generating the second output control signal.

30. The apparatus of claim 26, in which the input means is activated to produce the first output control signal, and in which the input means is deactivated to cause the correction means to automatically thereafter generate the second output control signal to provide the corrective movement of the movable indicator means.

31. The apparatus of claim 26, in which the input means comprise a pair of switches mounted on the stock of the firearm in a position for manual control by an operator holding the firearm in an aiming position for use in moving the movable indicator means relative to the sighting reference.

32. An electronic range measuring apparatus comprising:
   a viewing device through which a target of preselected size can be viewed;
   means for displaying an upper target bracketing line and a lower target bracketing line in the viewing device;
   means for producing a first electrical control signal representative of the preselected size of the target;
   means for controlling relative movement between the upper and lower target bracketing lines in response to an input from a manually operated control switch to adjust the spacing between said bracketing lines in response to the user's visually viewing the target through the viewing device to bracket the size of the target;
   means for producing a second electrical control signal representative of the set spacing between the upper and lower target bracketing lines;
   range measuring means responsive to the first and second electrical control signals for automatically producing a third electrical control signal representative of the range from the viewing device to the target as determined from the set distance between said bracketing lines and said preselected size of the target; and a digital display associated with the range measuring means and responsive to the third electrical control signal for displaying a digital readout of the range measurement.

33. An automatic range compensating system for a weapon which fires a projectile, comprising:
- an optical device for mounting on the weapon and through which a target can be viewed;
- a microprocessor for mounting on the weapon;
- range measuring means for producing a first control signal representative of the distance from the weapon to the target;
- ballistic data input means for producing a second control signal representative of data characteristic of the trajectory of the projectile fired by the weapon; and
- computing means within the microprocessor for receiving the first and second control signals and, in response thereto, producing a third control signal for producing within the field of view of the optical device an aiming compensation indicator as a function of the previously determined distance and ballistic information.

34. Apparatus according to claim 33 in which data input by the ballistic data input means include muzzle velocity for effecting the position of the aiming compensating indicator within the field of view of the optical device to compensate for ballistic characteristics of the projectile fired by the weapon.

35. Apparatus according to claim 33 in which the range measuring comprises means for displaying an upper target bracketing line and a lower traget bracketing line in the field of view of the optical device; and including means for contrrolling the relative distance between the upper and lower target bracketing lines in response to an input from a manually operated control switch to adjust the spacing between the bracketing lines in response to the user's visually viewing the target through the viewing device to bracket the size of the target; and in which the first control signal is produced in response to the set spacing between the upper and lower target bracketing lines.

* * * * *

UNITED STATES PATENT AND TRADEMARK OFFICE
CERTIFICATE OF CORRECTION

PATENT NO. : 4,777,352
DATED : October 11, 1988
INVENTOR(S) : Sidney D. Moore

It is certified that error appears in the above-identified patent and that said Letters Patent is hereby corrected as shown below:

On the Front Page:

[76]  Inventor:  Sidney D. Moore, 2173 Wilkes Court, Claremont, CA 91711

In the Specification:

Column 2, line 40, change "simples" to -- simplest --.
Column 2, line 52, change "mm." to -- mm --.
Column 2, line 56, change "comepnsatory" to
          -- compensatory --.
Column 3, line 40, before "Akin" insert -- to --.
Column 4, line 22, before "provision" delete "in" and
          insert therefor -- no --.
Column 4, line 44, change "matter" to -- matters --,
Column 4, line 63, change "wires," to -- wires. --
Column 4, line 67, change "compensting" to -- compensating --.
Column 5, line 16, change "interst" to -- interest --.
Column 5, line 23, after "members" delete the comma.
Column 5, lines 44-46, after "when" insert a comma; after
          "performance" delete the comma. The sentence
          should read -- When, subsequently, compared
          to actual cartridge performance these
          computer-generated tables have proved
          remarkably accurate.
Column 5, line 68, after "4,020,739 to" insert
          -- Piotrowski --.

UNITED STATES PATENT AND TRADEMARK OFFICE
CERTIFICATE OF CORRECTION

PATENT NO. : 4,777,352

DATED : October 11, 1988

INVENTOR(S) : Sidney D. Moore

It is certified that error appears in the above-identified patent and that said Letters Patent is hereby corrected as shown below:

```
Column 6, line 3, change "shoooting" to -- shooting --.
Column 6, line 16, change "prvoide" to -- provide --.
Column 6, line 25, after "accomplish" delete "to" and insert
          therefor -- the --.
Column 6, line 29, change "their usual positions" to
          -- his usual position --.
Column 6, line 37, change "reamaining" to -- remaining --.
Column 7, line 18, change "ony" to -- only --.

Column 9, line 36, change "0.008" to -- 0.0008 --.
Column 9, line 39, change measuremnt" to -- measurement --.
Column 9, line 60, change "preferrably" to -- preferably --.
Column 10, line 6, change "correspond" to -- corresponds --.
Column 10, line 53, change "tuned" to -- turned --.
Column 10, line 58, change "momentry" to -- momentary --.
Column 10, line 58, change "swithes" to -- switches --.
Column 11, line 39, change "liklihood" to -- likelihood --.
Column 12, line 23, change "(150-200 mm)" to -- (150 mm) --.
```

UNITED STATES PATENT AND TRADEMARK OFFICE
CERTIFICATE OF CORRECTION

PATENT NO. : 4,777,352

DATED : October 11, 1988

INVENTOR(S) : Sidney D. Moore

It is certified that error appears in the above-identified patent and that said Letters Patent is hereby corrected as shown below:

In the Claims:

```
Column 14, line 48, change "molvable" to -- moveable --.
Column 17, line 52, change "know" to -- known --.
Column 18, line 58, change "appartus" to -- apparatus --.
Column 20, line 38, change "comprise" to -- comprises --.
Column 22, line 10, change "comprises means" to
          -- means comprises --.
Column 22, line 13, change "contrrolling" to
          -- controlling --.
```

Signed and Sealed this

Fourth Day of July, 1989

*Attest:*

DONALD J. QUIGG

*Attesting Officer*  *Commissioner of Patents and Trademarks*